United States Patent [19]
Celi, Jr. et al.

[11] Patent Number: 5,745,762
[45] Date of Patent: Apr. 28, 1998

[54] ADVANCED GRAPHICS DRIVER ARCHITECTURE SUPPORTING MULTIPLE SYSTEM EMULATIONS

[75] Inventors: Joseph Celi, Jr., Boynton Beach; Jonathan M. Wagner, Coral Springs; Roger Louie, Deerfield Beach, all of Fla.

[73] Assignee: International Business Machines Corporation, Armonk, N.Y.

[21] Appl. No.: 356,525

[22] Filed: Dec. 15, 1994

[51] Int. Cl.⁶ .................................................. G06F 9/44
[52] U.S. Cl. .......................................... 395/681; 395/684
[58] Field of Search ................................. 395/700, 650, 395/681, 684

[56] References Cited

U.S. PATENT DOCUMENTS

| | | | |
|---|---|---|---|
| 4,855,724 | 8/1989 | Yang | 340/703 |
| 5,027,212 | 6/1991 | Marlton et al. | 358/183 |
| 5,097,257 | 3/1992 | Clough et al. | 340/814 |
| 5,208,908 | 5/1993 | Harrison et al. | 395/150 |
| 5,212,770 | 5/1993 | Smith et al. | 395/155 |
| 5,214,761 | 5/1993 | Barrett et al. | 395/275 |
| 5,226,160 | 7/1993 | Waldron et al. | 395/650 |
| 5,257,387 | 10/1993 | Richek et al. | 395/800 |
| 5,269,021 | 12/1993 | Denio et al. | 395/700 |
| 5,291,585 | 3/1994 | Sato et al. | 395/500 |
| 5,299,307 | 3/1994 | Young | 395/161 |
| 5,319,751 | 6/1994 | Garney | 395/200 |
| 5,418,962 | 5/1995 | Bodin et al. | 395/700 |
| 5,459,867 | 10/1995 | Adams et al. | 395/700 |
| 5,504,920 | 4/1996 | Biggs et al. | 395/800 |
| 5,513,365 | 4/1996 | Cook et al. | 395/800 |

*Primary Examiner*—Kevin A. Kriess
*Attorney, Agent, or Firm*—Mark S. Walker; Andrew J. Dillon

[57] ABSTRACT

Disclosed is a support architecture that facilitates use of display device drivers containing a minimum of hardware-specific software code. A driver need support only a relatively few common functions, which act as building blocks for the larger, more complex operations typically requested by graphics engines. In order to mediate between the limited-instruction-set device driver and the various higher-level graphics engines, the invention includes a series of translation modules that simplify engine-originated instructions into simpler graphic components. A video manager supervises routing of instructions to the specific drivers they designate, and serializes access to hardware components so that graphic commands execute atomically (i.e., without interruption). The invention can accommodate multiple device drivers in parallel or serial configurations. Device drivers may be paired with specific graphics adapters, or multiple drivers, each responsive to a different graphics engine, can share a single graphics adapter. A particular driver may be selected by an application program, by a graphics engine, by a translation module, or by the video manager based on considerations of compatibility and efficiency. Ordinarily, a device driver controls the entire video display or a discrete region thereof during the time it processes a particular graphic function; however, the invention can also accommodate multiple video displays, each controlled by a separate device driver.

22 Claims, 2 Drawing Sheets

1

ADVANCED GRAPHICS DRIVER ARCHITECTURE SUPPORTING MULTIPLE SYSTEM EMULATIONS

FIELD OF THE INVENTION

This invention relates to graphics drivers, and in particular to an architecture for supporting different graphics subsystems and the various drivers usable therewith.

BACKGROUND OF THE INVENTION

Today even relatively modest personal computer systems have graphics subsystems that facilitate display of elaborate graphic patterns on a video or flat-panel display. The proliferation of applications generating such sophisticated graphics has engendered changes in the way computational responsibility for their actual rendering is allocated. In older systems, the main processor would perform all graphics processing (through a display controller) according to commands supported by the operating system—the software module responsible for managing the processing and transfer of information among various system resources. The desire for greater resolution and rendering capabilities eventually began to impose an excessive computational burden on the main processor, limiting overall speed and ultimately making this simple architecture obsolete.

System designers therefore began transferring graphics-processing tasks to separate graphics hardware boards, called "graphics adapters." These boards contain circuitry dedicated exclusively to drawing patterns on the display, and support both high speed and fine resolution. The fact that their functional repertoires are fixed did not initially prove limiting, since board capabilities were matched to the commands recognized by the main operating system. Application programs requiring graphics operations passed task commands to the operating system, which executed them through the graphics hardware.

The recent advent of graphical user interfaces ("GUIs") has largely rendered this arrangement obsolete as well. GUIs provide a visual metaphor of a real-world scene, such as a desktop, featuring icons that the user can manipulate with a pointing device such as a mouse. GUIs operate at a hierarchical level above the operating system but below applications, from which they accept functional commands that include requests for graphics operations. GUIs offer the user a colorful graphic environment that is preserved across applications designed for the GUI; they also impose substantial graphics-processing demands, typically requiring sophisticated graphics subsystems that include an application-program interface ("API") and a graphics engine. The API layer translates application commands, which are written in a high-level language, to the high-level drawing commands supported by the graphics engine, a specialized component of the operating system. The graphics engine, in turn, processes the high-level drawing commands into lower-level drawing commands supported by a graphics device driver. The device driver, finally, processes the lower-level drawing commands into output signals that drive the graphics adapter, which performs the actual drawing operations on the display. (Typically, the instantaneous appearance of the display is determined by the bitwise or bytewise contents of a display or frame buffer; the graphics adapter draws patterns on the display by modifying bits in the buffer.)

For example, GUI environments such as that available with the OS/2® operating system, available from International Business Machines Corp., permit the user to perform various operations in separate rectangular screen windows. The windows have characteristic appearances (colors, borders, shading, etc.), and must also exist alongside other windows and screen artifacts. In order to spare designers of applications intended for use on such a GUI from rewriting the copious graphics instructions associated with windows rendering and management each time these operations become necessary, the API packages these into high-level commands. Thus, the designer need only enter a WinDrawBorder instruction (along with appropriate parameters, such as window size) in order to give the application the ability to draw a window border. The API maintains a library of graphics instructions associated with each high-level command, and imports these into the application program when it is compiled or run.

The GUI must also be compatible with numerous available hardware platforms and graphics adapters. This is facilitated by interposing a device driver, which directly controls the graphics hardware, between that hardware and the graphics engine. Device drivers are a common expedient in current computer systems, and contain processing logic for controlling the low-level or device-specific components of a particular computer resource. Each hardware configuration is provided with a different graphics driver capable of translating the common set of graphics-engine commands, or "primitives," into signals specific to the graphics hardware. This arrangement provides consistency at the operating system and GUI level.

Matters become complicated, however, in systems that support applications written for different GUIs. For example, the OS/2 operating system accepts "native" commands from applications written specifically for OS/2 as well as "foreign" commands directed toward the Windows GUI marketed by Microsoft Corp. This versatility is ordinarily implemented by the simultaneous presence, in computer memory, of the graphics subsystems associated with each of the supported GUIs and the graphics drivers with which they are ordinarily paired.

Without special modification, each driver would operate in its usual fashion, under the assumption that it "owns" the graphics hardware (and without regard to the fact that other drivers also reside in memory and might suddenly become active). Unfortunately, modifying a driver to cooperate with other drivers represents a non-trivial task, not only because of the growing complexity of graphics drivers, but also due to the lack of agreed-upon standard for inter-driver cooperation.

A final complication occurs when graphics boards are updated. These hardware devices are frequently produced by independent vendors, which sell them to computer manufacturers for installation on an original-equipment manufacture (OEM) basis. If the hardware is to run the full repertoire of graphics subsystem functions associated with every supported GUI, the drivers must ordinarily be rewritten with each new equipment release.

DESCRIPTION OF THE INVENTION

Advantages of the Invention

An advantage the present invention is simultaneous support of a plurality of graphics device drivers, any of which may be selected for immediate implementation of a desired graphics function and without special programming to prevent unwanted interaction.

Another advantage of the invention is reduction of driver complexity through reduction in the required number of supported graphics operations.

A further advantage of the invention is reduction in the number of drivers required to adapt a given graphics-processing board to a plurality of GUIs.

Still a further advantage of the invention is the ability to support a variety of operating systems and GUIs.

SUMMARY OF THE INVENTION

The present invention provides a support architecture that facilitates use of device drivers containing a minimum of hardware-specific software code without compromising overall graphics functionality. This approach is particularly useful in systems employing a plurality of graphics subsystems, since the driver need only support the set of graphic function calls common to all subsystems. These relatively few common functions act as building blocks for the larger, more complex operations typically requested by graphics engines.

In order to mediate between the limited-instruction-set device driver and the various higher-level graphics engines, the invention includes a series of translation modules that simplify engine-originated instructions into simpler graphic components. A video manager supervises routing of instructions to the specific drivers they designate, and serializes access to hardware components so that graphic commands execute atomically (i.e., without interruption).

The invention can accommodate multiple device drivers in parallel or serial configurations, thereby facilitating, for example, simultaneous support of a plurality of graphics engines. Device drivers may be paired with specific graphics adapters, or multiple drivers, each responsive to a different graphics engine, can share a single graphics adapter. A particular driver may be selected by an application program, by a graphics engine, by a translation module, or by the video manager based on considerations of compatibility and efficiency. Ordinarily, a device driver controls the entire video display or a discrete region thereof during the time it processes a particular graphic function call; the video manager ensures proper serialization to avoid execution overlap. The invention can also accommodate multiple video displays, each controlled by a separate device driver.

The invention includes a graphics library containing device-level instruction sets, as well as the on-board capability to execute those commands, for a broad range of graphic operations. In this way, if the translation module is unable to decompose an engine-originated instruction into operations the driver is capable of performing, the invention can utilize the library as a default; this ensures that all graphics requests will ultimately be serviced.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
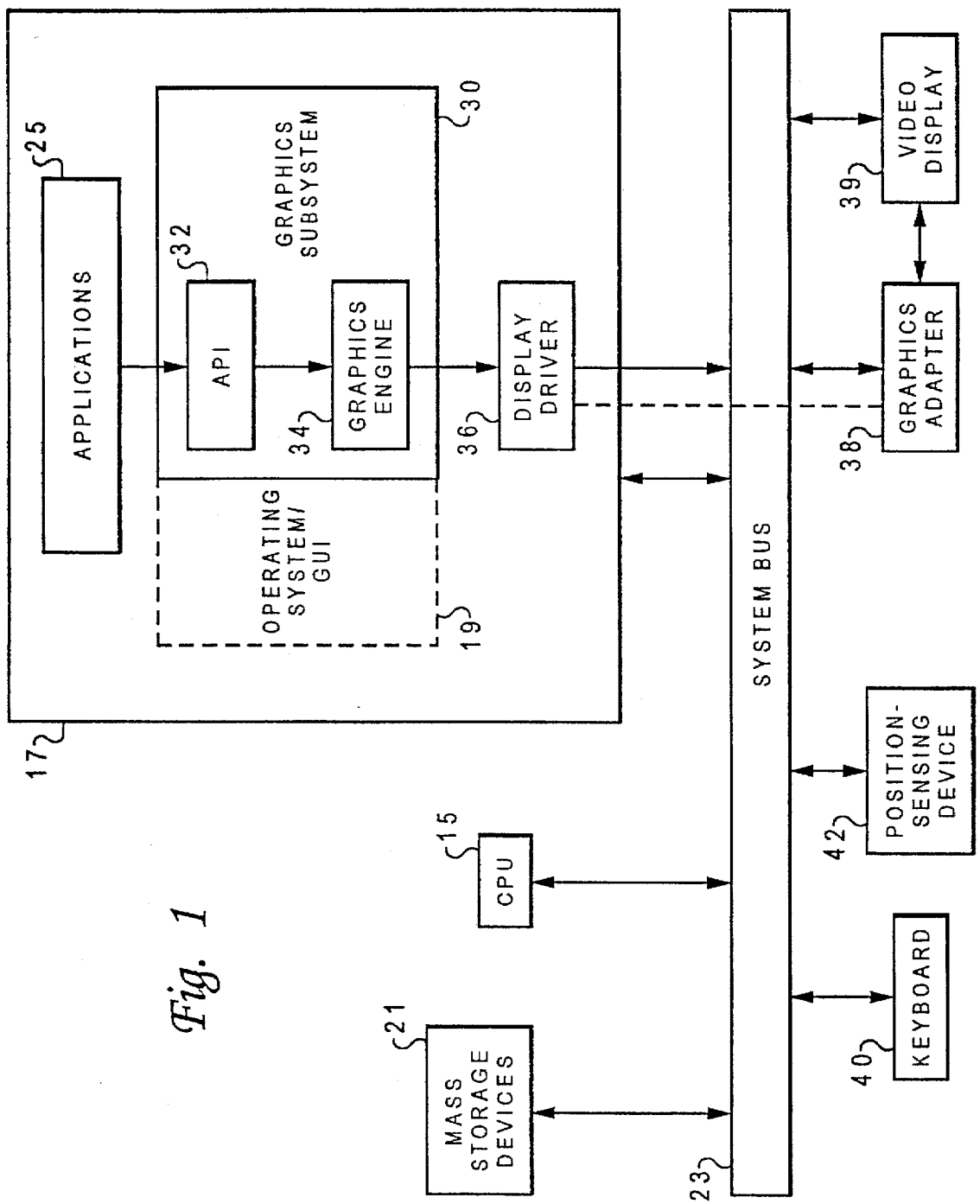
FIG. 1 schematically illustrates a representative hardware environment for the present invention.

Refer first to FIG. 1, which illustrates the hardware environment in which the present invention operates. The depicted computer system includes a central-processing unit 15, which performs operations on and interacts with a main system memory 17 and components thereof. System memory 17 typically includes volatile or random-access memory (RAM) for temporary storage of information, including portions of the computer's basic operating system and graphical user interface (denoted collectively by reference numeral 19). The system typically also includes read-only memory (ROM) for permanent storage of the computer's configuration and additional portions of the basic operating system, and at least one mass storage device 21, such as a hard disk and/or CD-ROM drive. All components of the system communicate over a bidirectional system bus 23.

The user ordinarily interacts with the system as it runs one or more application programs 25, at least portions of which reside in system memory 17. As used herein, the term "application program" refers broadly to any body of functionality for processing information of interest to the user and presenting that information in a manner that involves graphics operations. While graphics processing is the primary focus of design applications such as drawing and computer artwork packages, even text and numerically oriented applications such as word processors and spreadsheets can have significant graphic components. This is especially true in the context of systems that include a graphically sophisticated operating system and GUI that make use of a dedicated graphics subsystem 30. (Although, as noted previously, the GUI ordinarily mediates between applications and the basic operating system, the functionality of graphic subsystems can be distributed between these components, and so the two are merged in the figure for simplicity of presentation.)

Graphics subsystem 30 includes an application program interface (API) 32, which translates high-level application instructions into commands within the repertoire of a graphics engine 34. Graphics engine 34, in turn, processes these commands into output signals conveyed to a display driver 36, which is matched to and drives a graphics adapter 38. This latter component, finally, directly affects the contents of a video display 39 (e.g., by setting the bitwise contents of a display buffer in memory 17). A system may support more than one GUI or at least accommodate more than one set of API commands. This may be accomplished using multiple APIs and multiple graphics engines, or a single engine 34 capable of processing the different outputs.

The user interacts with the system using a keyboard 40 and a position-sensing device (e.g., a mouse) 42. The output of either device can be employed to designate information or select particular areas of video screen display 39 when the user interacts with applications 25.

Figure 2:
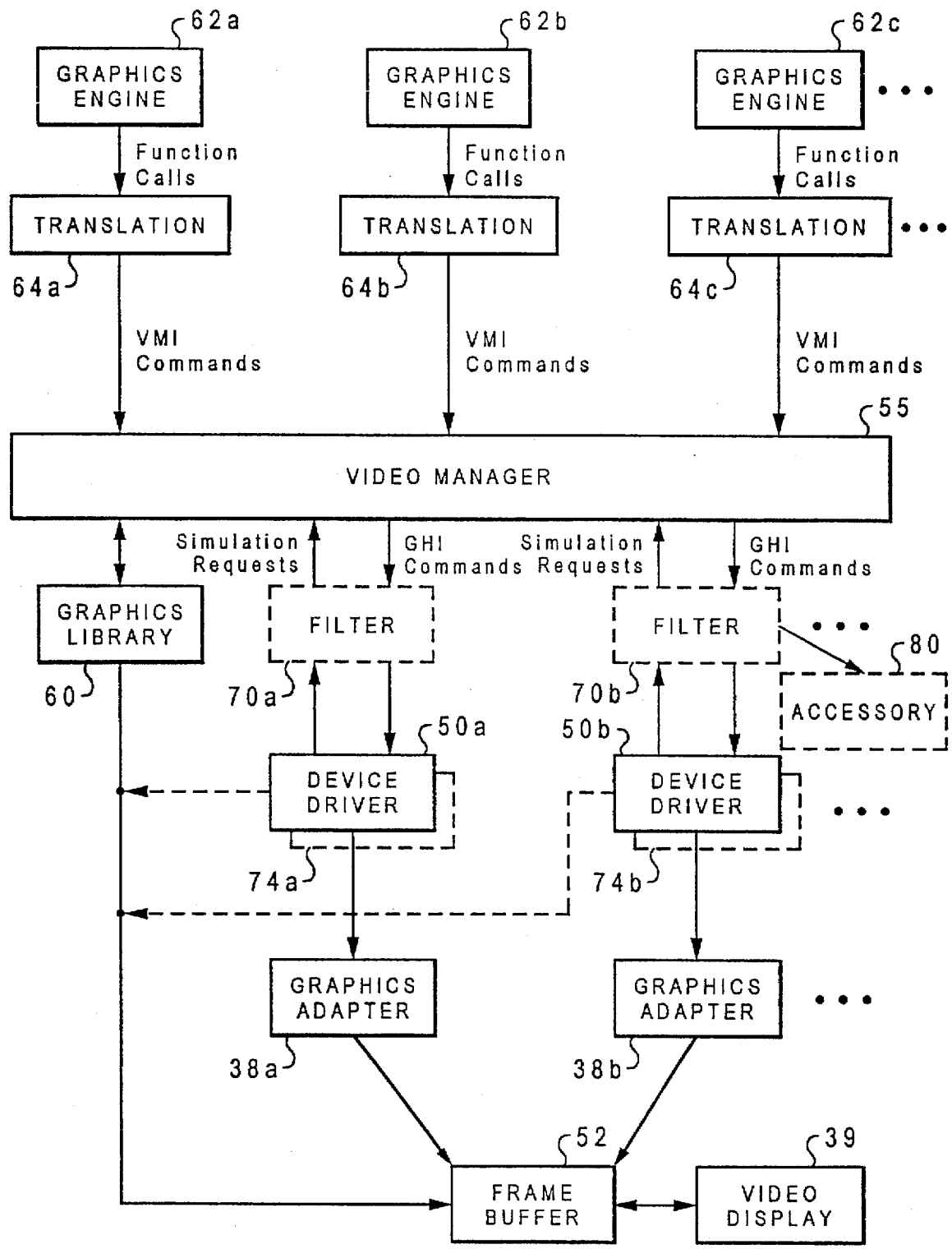
FIG. 2 schematically illustrates the components and operation of the present invention.

The present invention provides a facility for the development of display drivers and accommodation of drivers having limited output instruction sets by interposing a series of modules between graphics engine 34 and display driver 36. Such modules are illustrated in FIG. 2.

Essentially, the invention comprises an architecture that coordinates communication between each of what may be several graphics engines and the available graphics hardware via one or a plurality of device drivers representatively denoted by reference numerals 50a, 50b; like other elements of the invention, only a small number are actually illustrated in the drawing, the ellipsis notation indicating the possibility of additional such elements. Each device driver 50a, 50b generates output signals that drive an associated graphics adapter 38a, 38b. The graphics adapters are hardware video or graphics accelerator boards, well known in the art and undergoing constant development and improvement. A device driver is typically matched to a particular graphics adapter.

Each graphics adapter directly modifies the contents of a frame buffer 52 (generally through a dedicated graphics processor chip). Frame buffer 52 is typically a partition of memory 17 dedicated exclusively to video output, the instantaneous bitwise or (more typically) bytewise contents of which determine the pixel-by-pixel appearance of video display 39. As indicated by dashed lines, device drivers 50a, 50b can be configured to occasionally bypass graphics adapters 38a, 38b and write directly to frame buffer 52 (e.g., to quickly display a stored pixelmap).

Overall management of the invention architecture is controlled by a video manager module 55. This module recognizes a characteristic set of video-manager interface ("VMI") commands, which it utilizes to take various actions and generate graphics hardware interface ("GHI") commands recognizable to a selected device driver. The VMI commands thus represent a set of functions that include commands common to a variety of graphics engines.

If a device driver has not been provided with the ability to execute a particular GHI command, it can send manager 55 a "simulation request," causing it to perform the designated graphics function directly. Manager 55 carries out simulation requests by accessing a stored library 60 of graphics functions. Library 60, retained permanently on a mass storage device 21 but cached in system memory 17 during operation for rapid access, represents a generic library of standard graphic functions (along with the instructions necessary to execute those operations) that may be called by manager 55 for direct execution. For example, library 60 may contain routines that perform basic bit-transfer and line-drawing operations, as well as graphic elements stored in bitmap form; in response to a simulation request, manager 55 can perform the requested operation directly or locate the proper bitmap and cause its transfer directly to frame buffer 52.

Alternatively or in addition, manager 55 can be provided with command templates, stored in partitions of system memory 17, which specify the set of commands recognized by each of device drivers 50a, 50b. If an incoming function request does not correspond to a command in the template of a selected device driver, manager 55 can be configured to implement the function directly (by accessing an appropriate entry of library 60) without waiting for a simulation request from the device driver. (As discussed below, manager 55 can also use the template to select the optimal one of a variety of device drivers to execute the command.)

Requests for graphic functions originate with one or more graphics engines 62a, 62b, 62c. Each of these may represent a separate operating system supported by the computer, or emulations of different operating systems. For example, an operating system may utilize a "microkernel" that supports operation of various "personalities," each of which replicates the behavior of a different operating system (such as AIX) or GUI (such as XWINDOWS), each of which may have its own unique device-driver model.

Accordingly, each graphics engine may be paired with a specific one of the device drivers, or, instead, multiple engines may instead issue commands for ultimate execution by a single device driver (in conjunction with the support function provided by library 60) or any of multiple drivers. This configuration effectively renders the architecture operating-system independent, and is facilitated by a translation module 64a, 64b, 64c associated with each graphics engine. The translation modules convert function calls from the graphics engines into VMI commands recognizable by manager 55. Translation modules 64a, 64b, 64c may operate, for example, by simple table lookup.

For example, a graphics engine may issue generic function calls such as bit-block transfer ("bitbit," which causes transfer of a rectangular array of bitmap or pixelmap data) or specialized calls such as "paint window,""draw text," or "draw line." While primitive function calls can be passed through to manager 55 merely by converting them into the standard VMI format, the translation modules decompose higher-level engine commands into constituent elements drawn from the VMI command set. The repertoire of commands recognized by manager 55 is a matter of design choice. A large set of recognized commands requires less translation overhead but greater processing capacity by manager 55; on the other hand, virtually all graphic functions can ultimately be reduced to sequences of bitbit and line-drawing instructions, simplifying the required capabilities of manager 55 but requiring greater processing time for translation.

Manager 55 serializes communications between translation layers 64a, 64b, 64c and each device driver to accommodate concurrent processing requirements. When it receives a VMI command, manager 55 requests a semaphore (if necessary) from operating system 19, and sends a corresponding GHI command to a designated device driver only when it receives the semaphore. This prevents more than one program thread from accessing a device driver at a given time, and ensures that rendering commands will be executed atomically.

The various components of the invention will now be described in greater detail.

1. Video Manager 55

Manager 55 receives requests from the various translation layers according to a special protocol, the video manager interface, which consists of a small set of operations each identified by a function number. Preferably, manager 55 is implemented as an object in an object-oriented program environment, and exports an entry point for access by the translation layers. A translation layer furnishes the following information to the entry point:

ULONG EXPENTRY VMIEntry (ID, FUNCTION, $P_{in}$, $P_{out}$);

The ID parameter identifies the device driver, the FUNCTION parameter is a number that identifies the requested VMI operation, and the $P_{in}$ and $P_{out}$ parameters are pointers to input and output data structures, respectively, that are relevant to the requested operation. Manager 55 passes most of the requested operations directly to the device driver, changing only the prefix of the command from VMI to GHI. The following calls are common to both the VMI and GHI, and are passed through in this fashion:

| VMI_CMD_INIT | GHI_CMD_INIT |
|---|---|
| VMI_CMD_INITPROC | GHI_CMD_INITPROC |
| VMI_CMD_TERM | GHI_CMD_TERM |
| VMI_CMD_TERMPROC | GHI_CMD_TERMPROC |
| VMI_CMD_QUERYCAPS | GHI_CMD_QUERYCAPS |
| VMI_CMD_QUERYMODES | GHI_CMD_QUERYMODES |
| VMI_CMD_SETMODE | GHI_CMD_SETMODE |
| VMI_CMD_PALETTE | GHI_CMD_PALETTE |
| VMI_CMD_BITBLT | GHI_CMD_BITBLT |
| VMI_CMD_LINE | GHI_CMD_LINE |
| VMI_CMD_MOVEPTR | GHI_CMD_MOVEPTR |
| VMI_CMD_SETPTR | GHI_CMD_SETPTR |
| VMI_CMD_SHOWPTR | GHI_CMD_SHOWPTR |
| VMI_CMD_VRAMALLOC | GHI_CMD_VRAMALLOC |
| VMI_CMD_REQUESTHW | GHI_CMD_REQUESTHW |
| VMI_CMD_BANK | GHI_CMD_BANK |
| VMI_CMD_EXTENSION | GHI_CMD_EXTENSION |

When manager 55 receives a request from a translation module, it examines the function number and either handles the operation directly or forwards it to the designated device driver after changing the prefix. The device driver, upon receiving the command, responds with a character string or signal indicating success, error, or a request for simulation. Accordingly, the only required features of a compatible device driver are (i) the ability to recognize GHI-prefixed commands; (ii) the ability to process the following "base function" set of commands, and (iii) the ability to return success, error, or simulate call to manager 55 in response to a command received from manager 55.

GHI_CMD_INIT
GHI_CMD_QUERYCAPS
GHI_CMD_QUERYMODES
GHI_CMD_SETMODE
GHI_CMD_PALETTE

These and related optional commands, and their VMI counterparts, perform the following functions.

VMI_CMD_INIT, GHI_CMD_INIT: Causes manager 55 to recognize a translation module and accept subsequent commands from it. The GHI form of the instruction represents the first instruction a device driver receives from manager 55; in response, the device driver returns to manager 55 the number of function classes (a concept discussed below) that it supports. Manager 55 also assigns the device driver a unique identifier when it passes the GHI_CMD_INIT command.

VMI_CMD_INITPROC, GHI_CMD_INITPROC: Causes manager 55 to recognize a command-issuing process (usually a translation module). The GHI form of the instruction informs the designated device driver of the existence of the process. This command can be used to enforce security, preventing unauthorized processes from obtaining access to the video hardware.

VMI_CMD_TERM, GHI_CMD_TERM: Informs manager 55 that a translation module is being terminated. The (GHI form of the instruction deactivates the associated device driver.

VMI_CMD_TERMPROC, GHI_CMD_TERMPROC: Informs manager 55 and the designated device driver that a process is being terminated.

VMI_CMD_QUERYCAPS, GHI_CMD_QUERYCAPS: This command is used to query the capabilities of a designated device driver; a translation module, for example, may utilize the response to learn which graphic commands a driver is capable of processing and thereby determine the range of allowed output. Manager 55 reformats this command and passes it directly to the driver, which responds by filling a data structure with identifiers for (or pointers to other data structures specifying) the function sets the driver supports. For example, all device drivers support the "base function" class, and may support others as well.

VMI_CMD_QUERYMODES, GHI_CMD_QUERYMODES: When passed to a driver, causes the driver to return the video modes it is capable of supporting. A video mode specifies the screen resolution and color range. For example, a VGA adapter supports 16 colors and resolutions up to 640×480 pixels; super VGA mode supports 256 colors and resolutions of 1024×768 pixels and up. source and destination coordinates and extents. Additional parameters, such as graphic patterns, can be specified as well.

A representative first data structure (BMAPINFO) is as follows:

```
typedef struct _BMAPINFO {          /* bmapinfp */
    ULONG ulLength;
    ULONG ulType;
    ULONG ulWidth;
    ULONG ulHeight;
```

-continued

```
    ULONG ulBpp;
    ULONG ulBytesPerLine;
    PBYTE pBits
} BMAPINFO
typedef BMAPINFO *PBMAPINFO;
typedef struct _BLTRECT {           /* bltrect */
    ULONG ulXOrg;
    ULONG ulYOrg;
    ULONG ulXExt;
    ULONG ulYExt;
} BLTRECT *PBLTRECT;
``` where ulLenth is the length of the BMAPINFO data structure, in bytes; ulType is a description of the bit-block transfer as discussed below; ulWidth and ulHeight are the width and height, respectively, of the bitmap in pels; ulBpp is the number of bits per pel/color depth; ulBytesPerLine is the number of aligned bytes per line; pBits is a pointer to the bitmap bits; ulXOrg and ulYOrg are the X-origin and Y-origin, respectively, of the destination bitblock transfer; and ulXExt and ulYExt are the X and Y extents, respectively, of the bit-block transfer.

A representative set of define statements for the ulType field of the BMAPINFO data structure is as follows:

VMI_CMD_SETMODE, GHI_CMD_SETMODE: Called to set a graphics adapter to a specific video mode.

VMI_CMD_PALETTE, GHI_CMD_PALETTE: Called to query or set the color palette of the graphics adapter. Manager 55 reformats this command and passes it directly to the designated driver, which returns the current palette or causes the adapter to adopt the palette specified in the function call. A flag associated with this function specifies which of these operations the driver is to perform.

A device driver can be configured to process the following commands or to return an RC—SIMULATE call to manager 55:

GHI_CMD_BITBLT
GHI_CMD_LINE
GHI_CMD_SETPTR
GHI_CMD_MOVEPTR
GHI_CMD_SHOWPTR

VMI_CMD_BITBLT, GHI_CMD_BITBLT: Requests rendering of a rectangle or series of rectangles by a bitbit operation according to parameters specified in an input data structure $P_{in}$. Manager 55 reformats this command and passes it directly to the designated device driver along with the $P_{in}$ data structure, which specifies foreground and background colors of the rectangle; the dimensions and color format of the source and destination bitmaps and, if applicable, the pattern bitmap; and pre-clipped

```
#define BMAP_VRAM       0x00000000
#define BMAP_MEMORY     0x00000001
``` where BMAP_VRAM refers to bitmaps in video memory and BMAP_MEMORY refers to bitmaps in system memory.

A representative second data structure (BITBLTINFO) is as follows:

```
typedef struct_BITBLTINFO {         /* bitbltinfo */
    ULONG       ulLength;
    ULONG       ulBltFlags;
```

```
        ULONG           cBlits;
        ULONG           ulROP;
        ULONG           ulMonoBackROP;
        ULONG           ulSrcFGColor;
        ULONG           ulSrcBGColor;
        ULONG           ulPatFGColor;
        ULONG           ulPatBGColor;
        PBYTE           abColors;
        PBMAPINFO       pSrcBmapInfo;
        PBMAPINFO       pDstBmapInfo;
        PBMAPINFO       pPatBmapInfo;
        PPOINTL         aptlSrcOrg;
        PPOINTL         aptlPatOrg;
        PBLTRECT        abrDst
        PRECTL          prclSrcBounds
        PRECTL          prclDstBounds
    } BITBLTINFO;
    typedef BITBLTINFO *PBITBLTINFO;
``` where ulLength is the length of the BITBLTINFO data structure in bytes; ulBItFlags are miscellaneous flags used by the graphics engine for rendering (and which indicate, for example, the direction of the bit-block transfer, whether the operation includes a source or pattern bitmap, and whether the source, destination and/or pattern bitmaps are transparent); cBlits is a count of bit-block transfers to be performed; ulROP designates a raster operation; ulMonoBackROP specifies a background mix; ulSrcFGColor specifies a monochrome source foreground color; ulSrcBGColor specifies a monochrome source background color and transparent color; ulPatFGColor and ulPatBGColor specify monochrome pattern foreground and background colors, respectively; abColors is a pointer to a color translation table; pSrcBmapInfo and pDstBmapInfo are pointers to BMAPINFO data structures for source and destination bitmaps, respectively; aptlSrcOrg and aptlPatOrg are pointers source and pattern origins, respectively; abrDst is a pointer to an array of bit-block transfer rectangles (specified by data structures including X and Y origins and extents); prclSrcBounds is a pointer to a source bounding rectangle of source bit-block transfers; and prclDstBounds is a pointer to a destination bounding rectangle of destination bit-block transfers.

VMI_CMD_LINE, GHI_CMD_LINE: Requests rendering of a line according to parameters specified in an input data structure Pin. Manager 55 reformats this command and passes it directly to the designated device driver along with the $P_{in}$ data structure, which specifies data such as line length, destination position and orientation, foreground and background colors, and whether the line is solid or patterned.

A representative first data structure (LINEPACK), which contains line information on a per-line basis, is as follows:

```
    typedef struct __LINEPACK {      /* linepack */
        ULONG       ulStyleStep;
        ULONG       ulStyleValue;
        ULONG       ulFlags;
        struct      __LINEPACK * plpkNext
        ULONG       ulAbsDeltaX; /* absolute (ptlStart.x - ptlEnd.x) */
        ULONG       ulAbsDeltaY; /* absolute (ptlStart.y - ptlEnd.y) */
        POINTL      ptlClipstart;
        POINTL      ptlClipEnd;
        POINTL      ptlStart;
        POINTL      pltEnd;
        LONG        lClipStartError;
    } LINEPACK; /* lpk */
    typedef LINPACK *PLINEPACK; /* plpk */
``` whereulStyleStep specifies the value to be added to ulStyleValue on each pel stepped along the style major direction;

ulStyleValue specifies the style value (composed of an error value and a mask position) at the current pel; ulAbsDeltaX and ulAbsDeltaY specified clipped Bresenham Delta X and Y values, respectively; ptlClipStart and ptlClipEnd are pointers to starting and endling locations, respectively, for execution of the Bresenham algorithm; ptlStart and ptlEnd are starting and ending locations, respectively, for the line; lClipStartError is the standard Bresenham error at the clipped start point; and ulFlags are flags used for the LINEPACK data structure, as follows:

LINE_DO_FIRST_PEL (draws the first pel)

LINE_DIR_Y_POSITIVE (indicates line direction is bottom-to-top)

LINE_HORIZONTAL (indicates line is horizontal; no Bresenham algorithm)

LINE_X_MAJOR (line is XMAJOR)

LINE_DIR_X_POSITIVE (line direction is right-to-left)

LINE_VERTICAL (line is vertical; no Bresenham algorithm)

LINE_STYLE_X_MAJOR (line style is XMAJOR)

LINE_SO_LAST_PEL (draws the last pel)

A representative second data structure (LINEINFO) is as follows:

```
    typedef struct __LINEINFO {      /* lineinfo */
        ULONG       ulLength;
        ULONG       ulType;
        ULONG       ulStyleMask;
        ULONG       cLines
        ULONG       ulFGColor;
        ULONG       ulBGColor;
        USHORT      usForeROP;
        USHORT      usBackROP;
        PMAPINFO    pDstBmapInfo;
        PLINEPACK   alpkLinePack;
        PRECTL      prclBounds;
    } LINEINFO; /* linfo */
``` where ulLength specifies the length of the LINEINFO data structure; ulType defines the line type, as follows:

LINE_SOLID (line will be solid in foreground color)

LINE_INVISIBLE (line is not drawn)

LINE_ALTERNATE (line will be alternative foreground and background color; ignores style)

ulStyleMask specifies a 32-bit style mask; cLines is a count of the lines to be drawn; ulFGColor and ulBGColor specify line foreground and background colors, respectively; ulForeROP and ulBackROP are line foreground and background mixes, respectively; pDstBmapInfo is a pointer to a destination surface bitmap; alpkLinePack is a pointer to the LINEPACK data structure; and prclBounds is a pointer to a bounding rectangle of a clipped line.

Using these data structures and definitions, a line starts from ptlStart and ends at ptlEnd (inclusive). The lClipStartError parameter represents the standard Bresenham error at the clipped start point, and is calculated from the initial error at the start point and the error increments for major and diagonal steps. Horiztonal and vertical lines are drawn from the clipped start to the clipped end. Lines are styled using the ulStyleMask, ulStyleStep and ulStyleValue; the ulStyleMask is a 32-bit style mask, ulStyleValue is the style value at the current pixel (pel), and ulStyleStep is the value to be added to ulStyleValue on each pixel stepped along the style major direction.

Manager 55 also supports a set of utility commands:

VMI_CMD_VRAMALLOC, GHI_CMD_VRAMALLOC: Called to allocate off-screen video memory.

VMI_CMD_REQUESTHW, GHI_CMD_REQUESTHW: An application (or translation module) uses this call to request access to the video hardware. This allows, for example, direct manipulation of frame buffer 52. In response to this command, manager 55 obtains a semaphore to ensure uninterrupted access to the video hardware, and establishes a data path between the requesting process and the appropriate graphics adapter or the frame buffer. This capability may be used, for example, by a multimedia application, which for performance reasons writes directly to frame buffer 52 when presenting software motion video.

VMI_CMD_BANK, GHI_CMD_BANK: Called to designate a specific video memory bank.

VMI_CMD_EXTENSION, GHI_CMD_EXTENSION: Called to send an extension command (discussed below) to a driver. The preferred data structure associated with this command is:

```
typedef struct _HWEXTENSION {
    ULONG    ulLength;
    ULONG    ulXSubFunction;
    ULONG    cSrcChangeRects;
    PRECTL   arectlScreen;
    ULONG    ulXFlags;
    PVOID    pExtPl;
} HWEXTENSION;
``` where ulLength is the size, in bytes, of the HWEXTENSION data structure; ulXSubFunction is an extension-specific function number; cSrcChangeRects is a count of screen rectangles affected by the extension; arectlScreen specifies an array of screen rectangles affected by the extension; ulXFlags, in the current embodiment, is a single flag facilitating hardware serialization; and pExtPl specifies an extension-specific input packet.

VMI_CMD_QUERYCHAININFO: Called to obtain a pointer to a data structure containing capability and mode information for each device driver. The preferred data structure for each driver is:

```
typedef struct _INFO {             /* driver information */
    ID                             identifier;
    PSZ                            pszDriverName;
    PFNHWENTRY                     pDriverEntry;
    ULONG                          cModes;
    struct _GDDMODEINFO            pModeInfo;
    struct _CAPSINFO               pCapsInfo;
    struct _DRIVERINFO             pNextDriverInfo
} INFO ;
``` where ID is the driver identifier; pszDriverName is the driver name; cModes is a count of available graphics modes supported by the driver; pModeInfo points to a data structure specifying the modes supported by the driver; pCapsInfo points to a data structure specifying the capabilities of the driver; and pNextDriverInfo points to the next data structure in the driver chain (discussed below).

In an illustrative embodiment, manager 55 is responsible for pointer management. Generally, the pointer will ultimately overwrite other on-screen material—if rendered objects are thought of as occupying planes arranged along a Z-axis, so that objects on higher-order planes occlude those on lower-order planes, the pointer generally occupies the highest Z-order plane—but will be the last object rendered; accordingly, the pointer is itself temporarily overwritten as lower-order objects are rendered.

When it receives a VMI command, manager 55 first determines whether execution of the command will affect the pointer. If so, it clears the pointer, passes the command to the designated device driver (or to graphics library 60), and replaces the pointer when the driver (or graphics library 60) has finished executing the command.

Manager 55 can also perform pointer operations in response to commands issued by applications 25. Manager 55 either executes these commands directly or passes them for execution to a designated device driver (equipped to handle pointer operations). The pointer commands supported are:

VMI_CMD_MOVEPTR, GHI_CMD_MOVEPTR: In response to this command, which includes a reference to a data structure indicating the pointer destination, manager 55 either performs the move operation or reformats this command and passes it to a designated device driver. This arrangement applies to the remaining commands as well.

VMI_CMD_SETPTR, GHI_CMD_SETPTR: Called to set the pointer AND, XOR masks and, for color pointers, to designate a bitmap.

VMI_CMD_SHOWPTR, GHI_CMD_SHOWPTR: Called to set the visibility state of the pointer.

2. Graphics Library 60

The capabilities of graphics library module 60 (that is, the range of graphic functions it is able to execute) determine the extent to which high-level function calls from graphics engines must be translated. In the simplest and currently preferred approach, graphics library 60 supports the BIT-BLT and LINE drawing commands using the parameters discussed above. Although this requires translation modules 64a, 64b, 64c to decompose function calls into these primitives before they can be executed (assuming that the associated device drivers are incapable of processing higher-level function calls), it affords simplicity in system design.

3. Filters

The present invention can also include one or more filter modules 70a, 70b interposed between each device driver and manager 55. These modules can enhance the overall functionality of a device driver or preprocess instructions before they reach the driver. For example, a filter can accommodate a device driver to the environment of the invention if the driver is capable of processing the base function command set but not according to the syntax recognized by the present invention. Instead the filter processes these commands, interacting with the device driver and manager 55 as necessary. For example, suppose the invention is to be used to test the capabilities of a device driver not otherwise intended for use with the invention. A filter module can be established with (i) a data structure specifying the driver's capabilities; (ii) the ability to generate output signals to the driver that determine or set its current video mode and palette; and (iii) the ability to process VMI commands and otherwise interact with manager 55. In this way, the device driver is integrated into the invention without special modification. The filter intercepts GHI commands, setting the driver mode and palette according to the instructions of manager 55, responding to GHI_CMD_QUERYCAPS and GHI_CMD_QUERYMODES commands, and otherwise converting GHI commands into forms consistent with the device driver's instruction set.

A filter can also view commands and parameter information without modifying them. One application of such a filter is use as a performance monitor. For example, the filter can receive commands from manager 55 and timestamp them before transferring the commands to the associated device driver, then record the time when the operation is completed. The difference between these timestamps represents the time taken by the device driver to execute the instruction. For example, in the preferred embodiment, a filter calls the driver with which it is associated as a process, thereby registering its completion automatically.

A filter can also screen commands, rejecting commands that the associated device driver is incapable of processing and signaling manager 55 accordingly. For example, the filter can be associated with a command template stored in a partition of memory 17, and configured to pass to the device driver only those commands conforming to a template entry. If a command fails to so conform, the filter can return a simulation request to manager 55. Once again, this approach eases compatibility between the invention and a device driver not specifically designed for operation with the invention.

This screening function can also be combined with processing capability. For example, a filter can analyze function parameters associated with a command (e.g., the data structures of the LINE or BITBLT instructions) for conformance to a template prior to transferring it to a device driver. The template can contain, for example, data specifying parameters that must contain arguments, as well as the form of argument (e.g., numerical) or its proper scope (e.g., a numerical range). In this way, the filter can act as a real-time debugger, rejecting commands that fail to satisfy basic structural requirements or which specify impossible arguments (e.g., a BITBLT larger than the frame buffer) and alerting manager 55 thereto.

Filters are also useful in conjunction with accessory modules such as remote screen monitoring utilities (such as the IBM Distributed Console Access Facility, or "DCAF"). These facilities operate over wide-area or local-area computer networks, conforming a target computer screen to the appearance of a base screen. DCAF transmits an initial pixelmap to the frame buffer of the target computer. Instead of retransmitting the entire screen each time it changes, however, DCAF instead transmits only rectangle changes. A receiving DCAF module on the target computer modifies the display based on the transmitted changes.

A filter can be used to monitor the flow of commands to a device driver and to transmit those affecting screen appearance to a DCAF accessory module 80 as well as to the device driver. Accessory module 80 sends these commands to the DCAF receiving module on the target computer, either directly or after processing them to determine the precise rectangle changes they produce.

4. Extensions

The architecture of the present invention allows for extensions to accommodate or take the fullest possible advantage of future hardware. Particularly if the components of the invention are used as part of an operating system (and not solely for driver design and development), the invention should allow for future enhancement of a driver command set or addition to a driver of an extension module that provides advanced capabilities.

In the former case, the entire driver and its associated function class(es) can simply be replaced. More typically, however, designers of drivers will make expansion modules available. The user of an existing driver may purchase the expansion module to enhance graphic capabilities, or may instead choose to retain the original driver. This approach not only avoids replacement of an entire driver, but also avoids the potential code corruption that might occur were only a single module of the driver replaced.

The invention facilitates driver expansion by providing for "virtual" or extension drivers within the above-described component architecture. Specifically, each enhancement, having a distinct repertoire of executable graphic functions, is treated as a separate function class. As mentioned above, a driver, in response to a GHI_CMD_INIT command, returns to manager 55 the function classes the driver supports. Manager 55 allocates one INFO data structure for each supported class, and assigns each class an identifier as if the class were itself a separate driver. Thus, as shown in FIG. 2, each driver 50a, 50b can be associated with an extension driver 74a, 74b. Extension drivers 74a, 74b each have separate a associated ID and therefore respond to commands specifying the ID as a separate driver module. However, each remains associated with the same graphics adapter 38a, 38b as the original driver.

Although each extension may theoretically be addressed directly, as a separate driver, practical considerations dictate use of the VMI_CMD_EXTENSION command, which designates the base driver with which the extension is associated as well as the extension itself. For example, a DCAF filter associated with the base device driver may not be associated with the extension; the cScrChangeRects field of the HWEXTENSION data structure provides the information accessory 80 will need to update the target screen. In addition, if manager 55 is to retain control of the pointer without being programmed to recognize all commands recognized by each extension—a requirement inconsistent with the generality afforded by the invention—it must be furnished with sufficient information (such as that contained in the HWEXTENSION data structure) regarding each extension command to derive necessary pointer operations.

5. Chains of Device Drivers

Each set of associated device drivers and associated graphics adapters and filters represents a "chain." In FIG. 2, driver 50a, adapter 38a and filter 70a are one chain, and driver 50b, adapter 38b and filter 70b a second chain. For example, one chain might be dedicated to graphics support of the IBM Presentation Manager® ("PM") GUI and the other to support of Microsoft Windows™. Two device drivers can also share a single graphics adapter and exist, in the present invention, as separate chains. Thus, continuing the previous example, device driver 50a might be dedicated to PM command processing and driver 50b to Windows command processing, but both commonly drive graphics adapter 38a.

Chains can be simultaneously resident in an operational sense, being independently actuated by commands designating particular device drivers. Chain selection commands can originate with an application, manager 55 or, preferably, a translation module, which selects the chain of the driver best suited to executing the translated command(s). This arbitration capability is implemented using templates and decision logic.

In particular, a field of the INFO data structure associated with each driver 50a, 50b identifies all function classes (including extension modules) supported by that driver. This structure is returned in response to the VMI_CMD_QUERYCAPS command, furnishing the requesting process with complete capability information for each driver and its extensions. Preferably, however, manager 55 supports an additional command, VMI_CMD_QUERYCHAININFO, which returns the INFO data structures associated with all registered device drivers. In the case of multiple active chains, a CHAININFO structure contains pointers to a linked list of all INFO data structures.

These data structures provide the templates according to which a translation module selects driver chains. The decision logic depends on the capabilities of the various drivers, the costs (e.g., time overhead) associated with each, and the needs of particular applications. For example, a GUI might require only a moderate resolution and palette range, so that a chain implementing VGA will suffice; a computer-aided design or image-processing program, by contrast, can require much more extensive—but also slower—graphics capabilities, necessitating use of a driver capable of fine resolution and a large palette.

Driver chain selection can take place serially or in parallel. In a serial configuration, each separate chain performs temporally separate operation on frame buffer 52; in other words, each chain, responding to commands from one or more translation modules, "owns" frame buffer 52 within timeslices allocated by manager 55. As described previously, manager 55 serializes interaction with frame buffer 52 to prevent overlap of graphics operations; a requested operation must be completed before manager 55 will pass another command down a chain or accord a process access to frame buffer 52.

Parallel operation can take different forms. In one implementation, different chains can control different regions (e.g., separate windows) within frame buffer 52. To return to a previous example, a GUI requiring only VGA support can have commands routed down a chain to a VGA adapter, while an image-processing program, operative within a discrete screen window, can have commands routed down a chain to a more powerful adapter. Each chain will operate on different pixel regions of frame buffer 52: the more powerful driver within the geometric confines of the program window, and the VGA driver to the remainder of the frame.

Another parallel operation involves multiple screens, wherein a single image is divided into segments for display on a matrix of contiguous screen displays. Each screen display is driven by a separate screen buffer 52. The use of multiple screens not only enlarges the user's view, but effectively multiplies the obtainable output resolution by the number of separate screens. Multiple-screen output can be implemented by means of a GUI expressly configured therefor or through the use of a filter configured to process the output of a normal-resolution GUI (e.g., by computationally projecting a pixel array onto a larger array, algorithmically adjusting for distortions and filling in dead space).

It will therefore be seen that the foregoing represents a highly extensible and advantageous approach to accommodation of multiple device drivers having varying capabilities and interoperabilities. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. Apparatus for transforming graphics engine function calls into graphics hardware interface signals that drive at least one graphics adapter device driver, the apparatus comprising:
   a. a plurality of graphics adapter device drivers each associated with a graphics adapter, each device driver being capable of transforming a set of graphics hardware interface commands into graphics adapter signals; and
   b. means for transforming graphics engine function calls into graphics hardware interface signals, said means including
      i. means for receiving function calls from a graphics engine;
      ii. means for selecting one of said plurality of device drivers to receive the transformed function calls; and
      iii. means for transforming the function calls into graphics hardware interface signals and routing said signals to the selected device drivers for processing.

2. The apparatus of claim 1 wherein the means for selecting selects a device driver in response to a selection signal from the at least one graphics engine.

3. The apparatus of claim 1 wherein an optimal device driver is capable of processing a function call more rapidly than the other device drivers, the means for selecting the optimal device driver.

4. Apparatus for supporting a plurality of graphics device driver modules that translate function calls from at least one graphics engine into output signals that drive at least one graphics adapter, the apparatus comprising:
   a. at least one graphics adapter capable of processing driver-output signals;
   b. a plurality of device drivers each associated with a graphics adapter, each device driver being capable of processing a set of function calls into driver-output signals; and
   c. driver-selection means for:
      i. receiving function calls from a graphics engine;
      ii. selecting device drivers to execute the function calls;
      iii. routing the function calls to the selected device drivers for processing; and
   a plurality of stored templates accessible to the selection means, each template comprising a set of function calls that one of the device drivers is capable of processing, and wherein the selection means selects a driver by locating in a template each function call received from the graphics engine.

5. The apparatus of claim 4 wherein the selection means is a video manager and further comprising a graphic drawing module, responsive to the video manager, for executing graphic operations, the video manager causing the graphic drawing module to execute graphic operations corresponding to function calls not located in any template.

6. The apparatus of claim 4 further comprising at least one translation module for translating at least some function calls from a graphics engine into function calls in the templates.

7. The apparatus of claim 6 wherein the selection means selects a driver in response to a selection signal from the at least one translation module.

8. Apparatus for transforming function calls from a plurality of graphics engines with graphics commands actionable by a plurality of graphics device driver modules that translate said graphics commands into graphic output displayable on a display device, the apparatus comprising:
   a. a frame buffer for storing an array of pixel values;
   b. a plurality of device drivers each associated with a graphics adapter, each device driver transforming a set of graphics commands into graphics adapter signals;
   c. a video manager for:
      i. receiving function calls from a plurality of graphics engines;
      ii. transforming the function calls into graphics commands and routing the graphics commands to a device driver for processing; and
   e. at least one graphics adapter for processing said graphics adapter signals and modifying pixel values in the frame buffer in response to said graphics adapter signals.

9. The apparatus of claim 8 wherein the video manager allocates to each function call an execution timeslice, during which access to the frame buffer is restricted to the graphics adapter executing the graphic operation corresponding to the function call.

10. The apparatus of claim 8 wherein the frame buffer is partitioned into a plurality of regions, each region corresponding to a discrete region on the display device.

11. The apparatus of claim 10 wherein each device driver simultaneously controls a different region of the frame buffer, the video manager allocating to each function call routed to one of the device drivers an execution timeslice, during which access to the region of the frame buffer controlled by the device driver is restricted to the graphics adapter executing the graphic operation corresponding to the function call.

12. The apparatus of claim 8 comprising a plurality of frame buffers and video displays associated therewith, each video display having a visual appearance determined by the array of pixel values of the associated frame buffer, wherein each device driver simultaneously controls a different one of the frame buffers, the video manager allocating to each function call routed to one of the device drivers an execution timeslice, during which access to the frame buffer controlled by the device driver is restricted to the graphics adapter executing the graphic operation corresponding to the function call.

13. Apparatus for supporting a plurality of graphics device driver modules that translate function calls from at least one graphics engine into graphic output on a screen display, the apparatus comprising:

a. a frame buffer for storing an array of pixel values;

b. a video display having a visual appearance determined by the array of pixel values;

c. a plurality of device drivers each associated with a graphics adapter, each device driver being capable of processing a set of function calls into driver-output signals;

d. a video manager for:
   i. receiving function calls from a plurality of graphics engines;
   ii. routing the function calls to the selected device drivers for processing;

e. at least one graphics adapter capable of processing driver-output signals, the at least one graphics adapter executing graphic operations, represented by the driver-output signals, on pixel values in the frame buffer; and a graphic drawing module, coupled to the frame buffer and responsive to the video manager, for executing graphic operations on pixel values in the frame buffer, the video manager causing the graphic drawing module to execute graphic operations corresponding to function calls outside any device-driver set.

14. The apparatus of claim 8 further comprising a position-sensing device for producing signals indicative of positions on the video display, the video manager further comprising means for operating the frame buffer to generate a pointer on the video display at the positions indicated by the signals.

15. The apparatus of claim 8 further comprising a system memory that includes a memory area accessible to the video manager and containing all device-driver graphics command sets.

16. The apparatus of claim 8 further comprising at least one translation module for translating at least some function calls from a graphics engine into supported function calls.

17. The apparatus of claim 16 wherein the video manager selects a driver in response to a selection signal from the at least one translation module.

18. A computer program product for use in a computer system having at least one graphics adapter capable of processing driver-output signals, and a plurality of device drivers, each device driver being capable of processing a set of function calls into driver-output signals, the computer program product comprising:

a computer usable medium having computer readable program code means embodied in said medium for transforming function calls from at least one graphics engine into graphics commands for device drivers that drive at least one graphics adapter, the program code means comprising:

first program code means for causing a computer to receive function calls from a graphics engine;

second program code means for transforming the function calls to graphics commands that can be processed by any one of a plurality of device drivers selecting device drivers to execute the function calls;

third program code means for causing the computer to route the graphics commands to a device driver for processing.

19. The computer program product as defined in claim 18 wherein the second program code means includes means for selecting a device driver in response to a selection signal from the at least one graphics engine.

20. The apparatus of claim 13 wherein each device driver simultaneously controls a different region of the frame buffer, the video manager allocating to each graphics command routed to one of the device drivers an execution timeslice, during which access to the region of the frame buffer controlled by the device driver is restricted to the graphics adapter executing the graphic operation corresponding to the graphics command.

21. The apparatus of claim 13 comprising a plurality of frame buffers and display devices associated therewith, each display device having a visual appearance determined by the array of pixel values of the associated frame buffer, wherein each device simultaneously controls a different one of the frame buffers, the video manager allocating to each graphics command routed to one of the device drivers an execution timeslice, during which access to the frame buffer controlled by the device driver is restricted to the graphics adapter executing the graphic operation corresponding to the graphics command.

22. The apparatus of claim 13 further comprising a position-sensing device for producing signals indicative of positions on the video display, the video manager further comprising means for operating the frame buffer to generate a pointer on the video display at the positions indicated by the signals.

* * * * *